(12) United States Patent
Nguyen et al.

(10) Patent No.: US 6,890,638 B2
(45) Date of Patent: May 10, 2005

(54) BALLISTIC RESISTANT AND FIRE RESISTANT COMPOSITE ARTICLES

(75) Inventors: Huy X. Nguyen, Midlothian, VA (US); Larry Dickson, Granville, OH (US)

(73) Assignees: Honeywell International Inc., Morristown, NJ (US); Composix Company, Newark, OH (US)

( * ) Notice: Subject to any disclaimer, the term of this patent is extended or adjusted under 35 U.S.C. 154(b) by 154 days.

(21) Appl. No.: 10/287,929

(22) Filed: Nov. 5, 2002

(65) Prior Publication Data

US 2004/0086729 A1 May 6, 2004

Related U.S. Application Data

(60) Provisional application No. 60/417,596, filed on Oct. 10, 2002.

(51) Int. Cl.$^7$ .................................................. B32B 5/06
(52) U.S. Cl. .......................... 428/301.1; 428/297.4; 428/298.1; 428/299.7; 428/300.7; 428/416; 428/458; 428/461; 428/425.8; 428/450
(58) Field of Search ................................. 428/462, 912, 428/920, 921, 113, 458, 461, 416, 425.8, 298.7, 297.4, 450, 298.1, 299.7, 300.7, 301.1; 442/134, 135, 136, 138

(56) References Cited

U.S. PATENT DOCUMENTS

| | | | |
|---|---|---|---|
| 3,849,178 A | 11/1974 | Feldman ...................... 117/72 |
| 3,934,066 A | 1/1976 | Murch ......................... 428/248 |
| 4,137,394 A | * 1/1979 | Meihuizen et al. .......... 528/100 |
| 4,198,328 A | 4/1980 | Bertelli et al. ................. 260/22 |
| 4,309,487 A | 1/1982 | Holmes ........................ 428/516 |
| 4,356,138 A | * 10/1982 | Kavesh et al. ................ 264/164 |
| 4,380,593 A | 4/1983 | Von Bonin et al. .......... 521/163 |
| 4,413,110 A | * 11/1983 | Kavesh et al. .............. 526/348.1 |
| 4,442,157 A | 4/1984 | Marx et al. ................... 428/173 |
| 4,542,170 A | 9/1985 | Hall et al. ..................... 523/179 |
| 4,780,359 A | 10/1988 | Trask et al. ................... 428/234 |
| 4,822,439 A | 4/1989 | Gauchel et al. .............. 156/285 |
| 4,822,657 A | 4/1989 | Simpson ........................ 428/69 |
| 4,842,923 A | 6/1989 | Hartman ...................... 428/219 |
| 4,857,364 A | 8/1989 | Von Bonin ................... 427/254 |
| 4,929,651 A | 5/1990 | Gauchel et al. .............. 523/505 |
| 5,130,349 A | 7/1992 | Eswarakrishnan et al. .. 523/179 |
| 5,167,876 A | 12/1992 | Lem ............................. 252/602 |
| 5,175,198 A | * 12/1992 | Minnick et al. ............. 523/222 |
| 5,185,103 A | 2/1993 | Eswarakrishnan et al. .. 252/606 |
| 5,215,813 A | 6/1993 | Hartman et al. ............. 428/226 |
| 5,225,464 A | 7/1993 | Hill, Jr. ........................ 524/100 |
| 5,356,568 A | 10/1994 | Levine ......................... 252/606 |
| 5,480,706 A | 1/1996 | Li et al. ....................... 428/113 |
| 5,591,791 A | 1/1997 | Deogon ........................ 524/80 |
| 5,702,657 A | * 12/1997 | Yoshida et al. .............. 264/112 |
| 5,708,065 A | 1/1998 | Martens et al. .............. 524/100 |
| 5,714,419 A | 2/1998 | Choate ......................... 442/136 |
| 5,759,692 A | 6/1998 | Scholz et al. ................ 428/413 |
| 5,962,603 A | 10/1999 | Qureshi et al. .............. 525/519 |
| 5,972,512 A | 10/1999 | Boisvert et al. ............. 428/409 |
| 6,044,605 A | 4/2000 | McDonald ................. 52/309.9 |
| 6,228,914 B1 | 5/2001 | Ford et al. ................... 524/124 |
| 6,309,746 B1 | 10/2001 | Broutier et al. ............. 428/375 |

FOREIGN PATENT DOCUMENTS

| | | | |
|---|---|---|---|
| DE | 2642883 A | | 3/1978 |
| DE | 3004694 | * | 11/1982 |
| GB | 2051667 | * | 8/1982 |
| GB | 2232063 A | | 12/1990 |
| GB | 2347112 A | | 8/2000 |

OTHER PUBLICATIONS

"Flame Retardancey of Polymeric Materials", vol. 1, p. 1–111 Kuryla and Papa Ed., Marcel Dekker, Inc, New York 1973,.

* cited by examiner

Primary Examiner—Paul Thibodeau
Assistant Examiner—Kevin R. Kruer
(74) Attorney, Agent, or Firm—Virginia Szigeti

(57) ABSTRACT

Ballistically resistant and fire resistant composite articles for aircraft interiors and other applications. Composite articles are provided having a flexural modulus of at least about 80,000 lbs/sq. in (552 MPa), a flexural strength at yield of at least about 800 lbs/sq. in. (5.52 MPa), an areal density of about 0.9 lb/ft$^2$ (4.40 kg/m$^2$) to about 1.5 lb/ft$^2$ (5.86 kg/m$^2$), a fire resistance meeting the requirements of §25.853 Title 14 of the United States Code, Jan. 1, 2002, and a V0 velocity of at least about 1430 ft/sec (427 m/s) when tested by United States Federal Aviation Administration Advisory Circular 25.795.2, 10 Jan. 2002, using .44 Magnum Jacketed Hollow Point (JHP) bullets of 240 grains (15.6 g) mass and using 9 mm Full Metal Jacketed, Round Nose (FMJ RN) bullets of 124 grains (8.0 g) mass.

18 Claims, No Drawings

BALLISTIC RESISTANT AND FIRE RESISTANT COMPOSITE ARTICLES

CROSS REFERENCE TO RELATED APPLICATIONS

The present invention claims the benefit of U.S. Provisional Application No. 60/417,596 filed Oct. 10, 2002.

BACKGROUND OF THE INVENTION

1. Field of the Invention

This invention relates to ballistically resistant and fire resistant composite articles, more particularly, for use in aircraft interiors, as well as other applications.

2. Description of the Related Art

Materials used in aircraft compartment interiors are regulated by Title 14 of the Code of Federal Regulations, Part 25. Until recently, the principal concern relating to such materials was fire resistance. However, in the wake of the aircraft hijackings of Sep. 11, 2001, by suicidal terrorists, protection against threats of other kinds has become a heightened concern. Principal among those concerns is security of the pilots and cockpit against firearms. A need exists for lightweight materials, for use in cockpit doors, that are resistant to penetration by handgun ammunition, and which also maintain current standards of fire resistance.

Fire resistant materials for aircraft interiors have been described in U.S. Pat. Nos. 4,780,359; 5,175,198; 5,714,419 and 5,972,512. U.S. Pat. No. 6,044,605 describes a door construction that, " . . . can be made with fire-resistant and ballistic-resistant materials . . . ".

U.S. Pat. No. 3,934,066 describes a fire-retardant laminate system suitable for application to a combustible or heat sensitive substrate comprising a flexible protective layer, and an intumescent layer comprising a porous cellulosic sheet material impregnated with an intumescent composition. The flexible protective layer may be a metal foil.

Materials possessing both fire resistance and ballistic resistance have been described in U.S. Pat. Nos. 4,822,439; 4,842,923; 4,929,651; 5,167,876; 5,215,813 and 5,480,706.

U.S. Pat. Nos. 4,822,439 and 4,929,651 describe composites comprising about 60% to about 75% by weight of woven magnesia aluminosilicate fiberglass roving impregnated with calcium hydroxide and an isophthalic thermoset polyester.

U.S. Pat. Nos. 4,842,923 and 5,167,876, describe composites comprising a plurality of layers of a balanced interlaced magnesia aluminosilicate glass fiber fabric in a matrix of a cured phenol formaldahyde resin having an areal density of at least 2.5 pounds per square foot.

U.S. Pat. No. 5,167,876, describes a composite comprising two or more layers, at least one of the layers being a network of fibers in a matrix and at least one of the layers being a fire retardant layer having endothermic properties on exposure to heat.

U.S. Pat. No. 5,480,706, describes a composite comprising a plurality of alternating first and second plies wherein the first ply comprises a network of high strength flammable fibers in a first matrix and the second ply comprises a network of fire resistant organic or inorganic fibers in a fire resistant matrix.

Each of the composite articles cited above represented progress toward the goals to which it was directed. However, none described the specific constructions of the present invention and none satisfied all of the needs met by this invention.

These earlier composite articles had the principal disadvantage of being largely comprised of relatively dense inorganic materials such as glass fibers. Such materials are not ideal for aircraft interiors where excess weight translates into unnecessary and costly fuel consumption. On the other hand, composite densities can be too low and take up excessive space. A need exists for composite materials exhibiting strength, toughness, ballistic resistance, and fire resistance combined with useful density.

SUMMARY OF THE INVENTION

The invention provides composite articles exhibiting strength, toughness, ballistic resistance, fire resistance and useful density in heretofore unknown combination. A composite of the invention has a flexural modulus of at least about 80,000 lbs/sq. in (552 MPa), a flexural strength at yield of at least about 800 lbs/sq. in (5.52 MPa), an areal density of about 0.9 lb/ft$^2$ (4.40 kg/m$^2$) to about 1.5 lb/ft$^2$ (5.86 kg/m$^2$), fire resistance meeting the requirements of Title 14 of the United States Code, §25.853, Jan. 1, 2002, and V0 velocity at least about 1430 ft/sec (427 m/s) when tested by United States Federal Aviation Administration (FAA) Advisory Circular 25.795.2, 10 Jan. 2002, using .44 Magnum Jacketed Hollow Point (JHP) bullets of 240 grains (15.6 g) mass and using 9 mm Full Metal Jacketed, Round Nose (FMJ RN) bullets of 124 grains (8.0 g) mass.

In one embodiment a composite article of the invention is comprised of a plurality of plies, wherein a first ply is comprised of a metal foil, a second ply is comprised of a fire retardant bonding material and a third ply is comprised of a plurality of layers, each of said layers comprising a network of flammable polymeric fibers in a matrix, said polymeric fibers having a tenacity of at least about 17 g/denier, a tensile modulus of at least about 500 g/denier and an energy-to-break of at least about 20 Joules/g.

DETAILED DESCRIPTION OF THE INVENTION

The invention provides composites exhibiting strength, toughness, ballistic resistance, fire resistance and low density in heretofore unknown combination. A composite article of the invention has a flexural modulus of at least about 80,000 lbs/sq. in (552 MPa), a flexural strength at yield of at least about 800 lbs/sq. in (5.52 MPa), an areal density of about 0.9 (4.40 kg/m$^2$) to about 1.5 lb/ft$^2$ (5.86 kg/m$^2$), fire resistance meeting the requirements of Title 14 of the United States Code, §25.853, Jan. 1, 2002, and a V0 velocity at least about 1430 ft/sec (427 m/s) when tested by United States Federal Aviation Administration Advisory Circular 25.795.2, 10 Jan. 2002, using .44 Magnum Jacketed Hollow Point (JHP) bullets of 240 grains (15.6 g) mass and using 9 mm Full Metal Jacketed, Round Nose (FMJ RN) bullets of 124 grains (8.0 g) mass.

The flexural modulus (modulus of elasticity in bending) and the flexural strength at yield of a composite of the invention are measured by American Society of Testing and Materials (ASTM) Standard Test Method ASTM D790-00.

Title 14 USC §25.853 sets forth the flammability standards for aircraft compartment interiors. Materials for interior partitions must meet the test requirements prescribed in Appendix F, Parts I, IV and V.

14 USC §25.853, Appendix F, Part I(a)1(i) specifies that partition materials must be self-extinguishing when tested vertically. Specimens to be tested must be at least 2 inches (5 cm) wide, 12 inches (30 cm) long and no thicker than the minimum thickness to be qualified for use in aircraft. A minimum of three specimens must be tested and results averaged. The specimen is exposed to the flame of a Bunsen or Tirrill burner with a minimum flame temperature of 1550° F. (843° C.). The flame is applied to the centerline of the lower edge of the specimen for 60 seconds and then removed. Average flame time after removal of the flame source may not exceed 15 seconds. The average burn length may not exceed 6 inches (15 cm). Drippings from the test specimen, if any, may not continue to flame for more than an average of 3 seconds after falling.

14 USC §25.853, Appendix F, Part IV specifies the maximum heat release rate from cabin materials exposed to radiant heat in a specially designed test chamber. Specimens are exposed to a radiant heat source adjusted to produce on the specimen, a total heat flux of 3.4 Watts/cm$^2$ over a five minute test duration. Test specimens are 5.91 in.×5.91 in. (14.9 cm×14.9 cm) and of the same thickness as to be used in aircraft. The specimen is tested with the exposed surface vertical. Combustion products leaving the test chamber are monitored to calculate the heat release rate. The total positive heat release over the first two minutes of exposure for each of the three or more samples are averaged, and the peak heat release rates for the samples are averaged. The average peak heat release rate must not exceed 65 kW/m$^2$. If melting, sagging, delamination, or other behavior that affects the exposed surface area or the mode of burning occurs, these behaviors must be reported together with the time at which such behaviors were observed 14 USC §25.853, Appendix F, Part V specifies the maximum smoke emission characteristics of cabin materials and refers to ASTM F814-83 for details of the test procedure. A minimum of three specimens must be tested and results averaged. Test specimens 3×3 inches (7.62×7.62 cm) are mounted in a vertical orientation within a specially designed chamber. An electrically heated radiant-energy source produces an irradiance level of 2.2 BTU/s-ft$^2$ (2.5 W/cm$^2$) averaged over the 1.5 inch (3.81 cm) diameter central area of the specimen. A six-tube burner is used to apply a row of equidistant flames across the lower edge of the exposed specimen area. The specific optical smoke density (Ds) obtained after 1.5 minutes and 4 minutes, as well as the maximum value of optical smoke density DsMax and the DsMax time are recorded. The average DsMax must not exceed 200.

The V0 velocity of a composite is the maximum velocity at which a specified projectile will not penetrate the composite. The V0 velocity of a composite of the invention is determined by the test procedures of United States FAA AC 25.795.2, 10 Jan. 2002, using .44 Magnum JHP bullets of 240 grains (15.6 g) mass and using 9 mm FMJ RN bullets of 124 grains (8.0 g) mass.

The velocity of the projectile is measured by lumiline screens along the path of the projectile. The test panel is mounted normal to the path of the projectile for four shots and also 30° off the normal for two shots with each projectile. The V0 velocity is determined by varying the propellant charge so as to cause complete and partial penetrations of the test panel at each impingement angle. The V0 velocity is the highest partial penetration velocity. A composite of the invention has a V0 velocity at least about 1430 ft/sec (427 m/s) when tested using .44 Magnum JHP bullets of 240 grains (15.6 g) mass and when using 9 mm FMJ RN bullets of 124 grains (8.0 g) mass.

In one embodiment a composite article of the invention is comprised of a plurality of plies bonded together, wherein a first ply is comprised of a metal foil, a second ply is comprised of a fire retardant bonding material and a third ply is comprised of a plurality of layers, each of said layers comprising a network of flammable polymeric fibers in a matrix, said polymeric fibers having a tenacity of at least about 17 g/denier, a tensile modulus of at least about 500 g/denier and an energy-to-break of at least about 20 Joules/g.

In another embodiment, a composite article of the invention is comprised of a plurality of plies bonded together, wherein a first ply is comprised of a metal foil, a second ply is an intumescent resinous composition, a third ply is comprised of a fire retardant bonding material, and a fourth ply is comprised of a plurality of layers, each of said layers comprising a network of flammable polymeric fibers in a matrix, said polymeric fibers having a tenacity of at least about 17 g/denier, a tensile modulus of at least about 500 g/denier and an energy-to-break of at least about 20 Joules/g.

Preferably, a composite article of the invention possesses a symmetric ply structure with the central ply being comprised of the network of flammable polymeric fibers in a matrix. In one preferred embodiment, the composite article is comprised of five plies bonded together, wherein the first and fifth plies are comprised of a metal foil, the second and fourth plies are comprised of a fire retardant bonding material and the central third ply is comprised of a network of flammable polymeric fibers in a matrix, said polymeric fibers having a tenacity of at least about 17 g/denier, a tensile modulus of at least about 500 g/denier and an energy-to-break of at least about 20 Joules/g.

In another preferred embodiment, the composite article is comprised of seven plies bonded together, wherein the first and seventh plies are comprised of a metal foil, the second and sixth plies are an intumescent resinous composition, the third and fifth plies are a fire retardant bonding material and the central fourth ply is comprised of a network of flammable polymeric fibers in a matrix, said polymeric fibers having a tenacity of at least about 17 g/denier, a tensile modulus of at least about 500 g/denier and an energy-to-break of at least about 20 Joules/g.

The plies in each embodiment are assembled and bonded together. Preferably the plies are bonded under heat and pressure. Preferably, the bonding is conducted at temperature of about 100° C. to about 150° C. at a pressure of about 15 psi (103 kPa) to about 5,000 psi (34,475 kPa) for a time sufficient to bond the plies. More preferably, the bonding is conducted at a temperature of about 120° C. to about 130° C. and at a pressure of about 50 psi (345 kPa) to about 200 psi (1,380 kPa), for a time period of about 30 minutes.

Preferably, the metal foil in each embodiment is aluminum having a thickness from about 0.0005 inch (12.7 micrometers) to about 0.005 inches (127 micrometers). More preferably, the metal foil is aluminum having a thickness from about 0.001 (25.4 micrometers) to about 0.003 inch (76.2 micrometers).

Preferably, the fire resistant bonding material is comprised of at least 10% by weight of a polymeric material selected from the group consisting of thermoplastics and thermosets. Thermoplastic polymers useful in the bonding material of the invention include, but are not restricted to: polyolefins, polydienes, polyesters, polyamides, vinyl polymers, ionomers, acrylics, acrylates, polysulfones, polyphenylene oxide, acetals, silicones, thermoplastic polyurethanes, thermoplastic polyimides, polyketones, and copolymers and halogenated derivatives thereof. Useful thermoset polymers include, but are not restricted to: phenolic polymers, melamine polymers, epoxies, silicones, unsaturated polyesters, and thermosetting polyurethanes.

The polymeric portion of the fire retardant bonding material may be intrinsically fire resistant or it may be rendered fire retardant by admixture with a fire retardant additive.

The fire retardant additive, if any, may be organic, inorganic, or organometallic. Examples of suitable fire retardant additives include, but are not restricted to the additives listed in "Flame Retardancy of Polymeric Materials", Vol 1, Kuryla and Papa Ed., Marcel Dekker, Inc, New York 1973. These include the following organic additives:

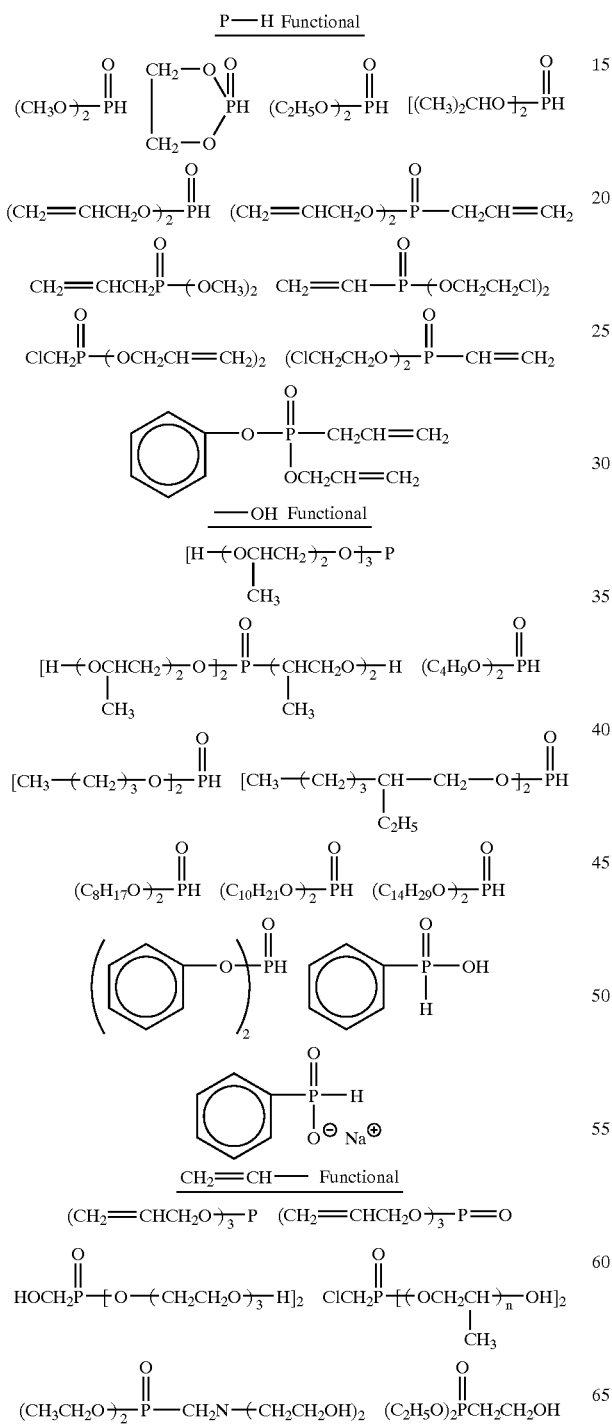

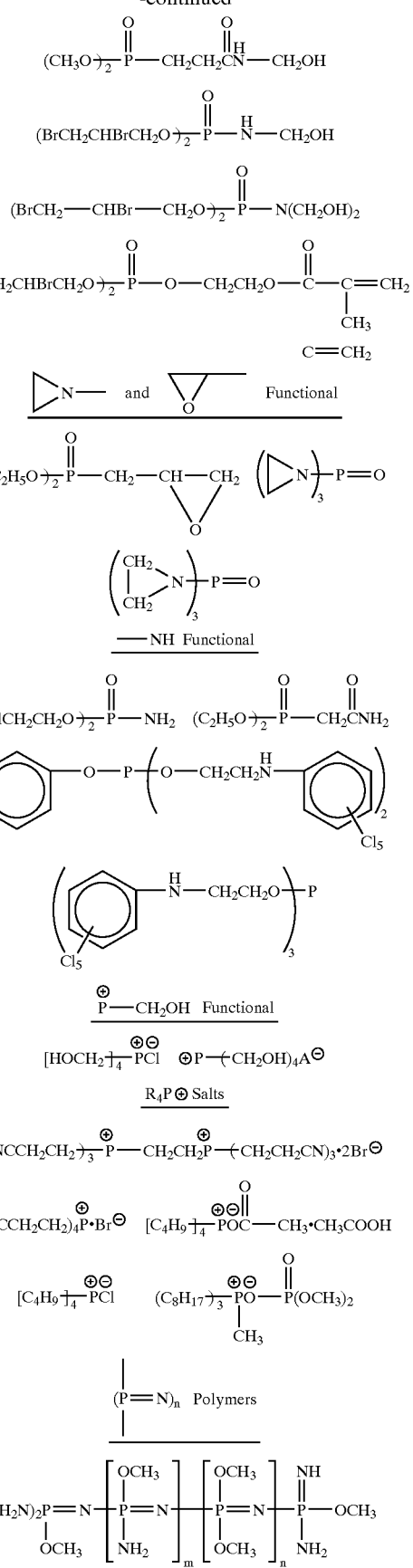

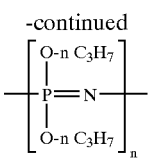
P—OH Functional
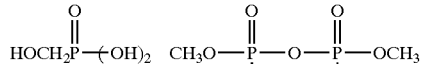
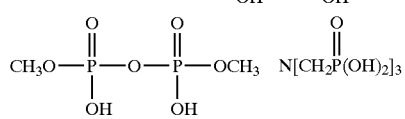
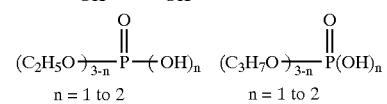
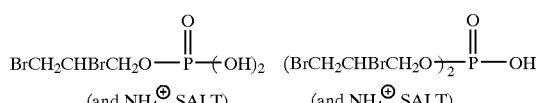
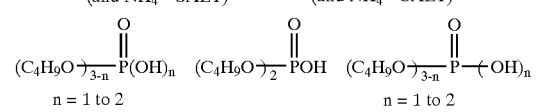
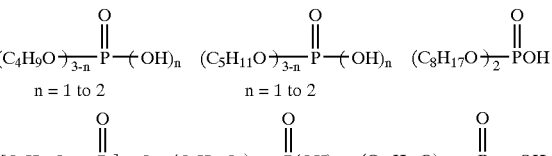
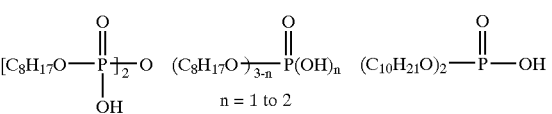
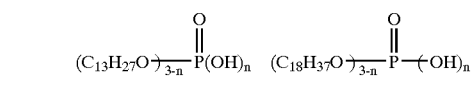
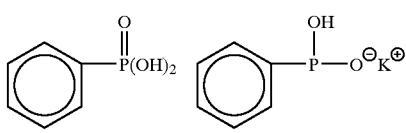
n = 1 to 2
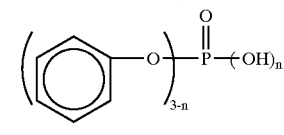
n = 1 to 2
P—Cl Functional
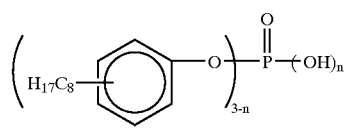
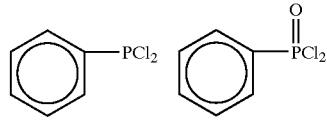
P + S Compounds
Functional
$(CH_3)_2P-S-S-P(CH_3)_2$
P + Br Compounds
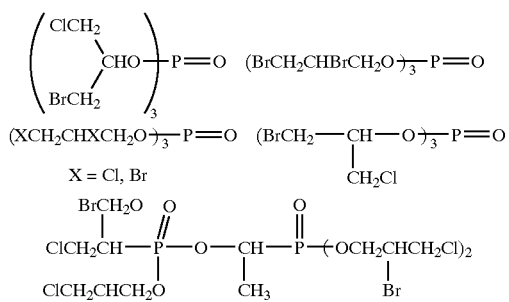
X = Cl, Br
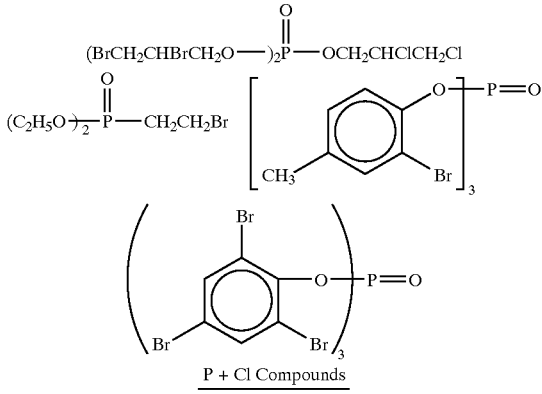
P + Cl Compounds
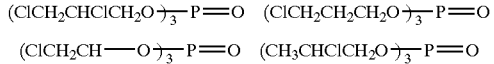
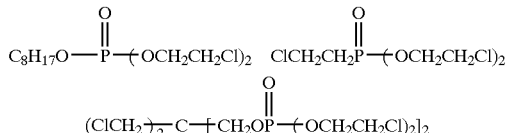
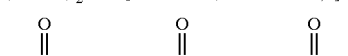
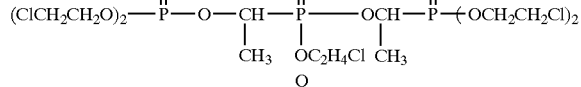
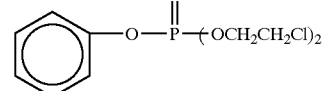
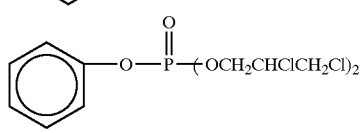
P (Phosphites)
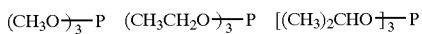

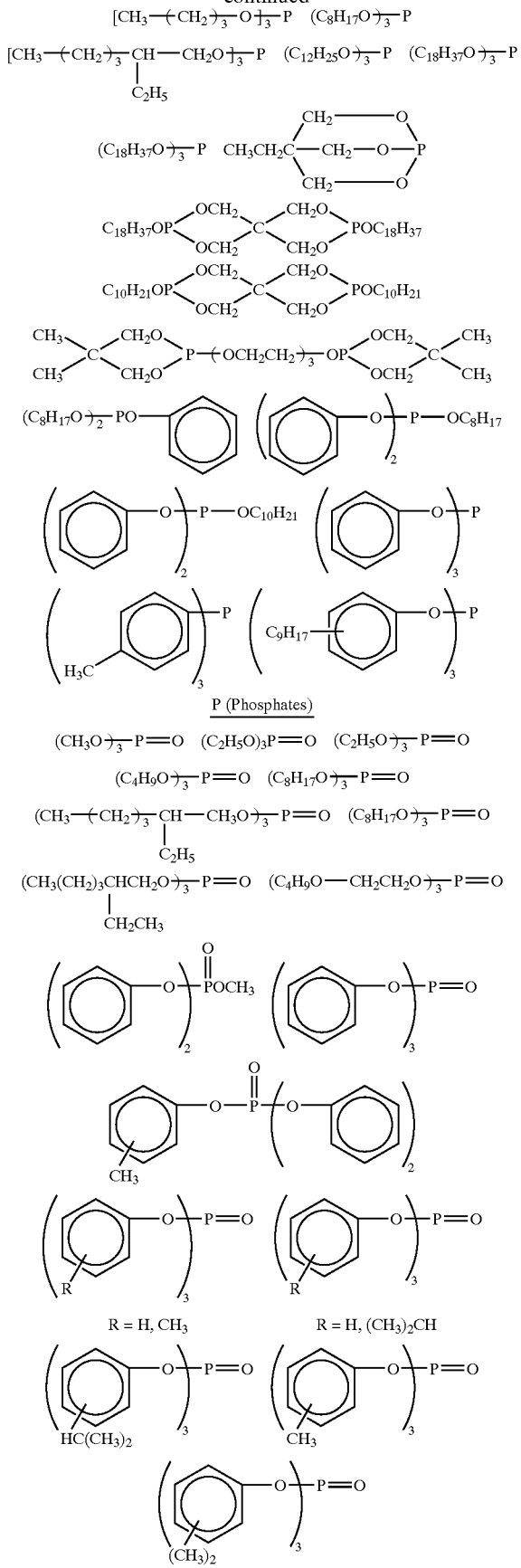
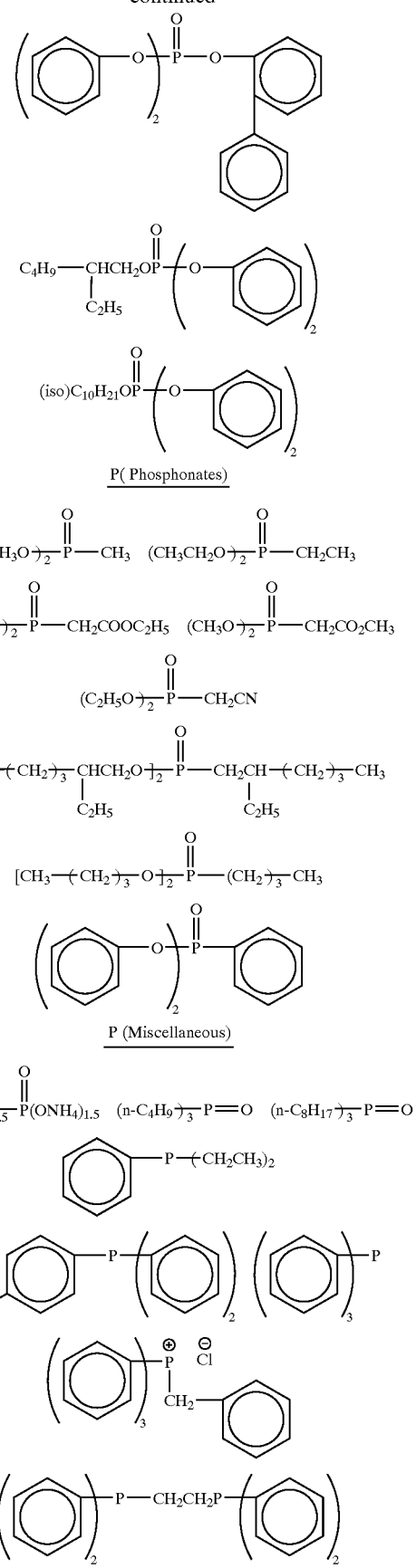

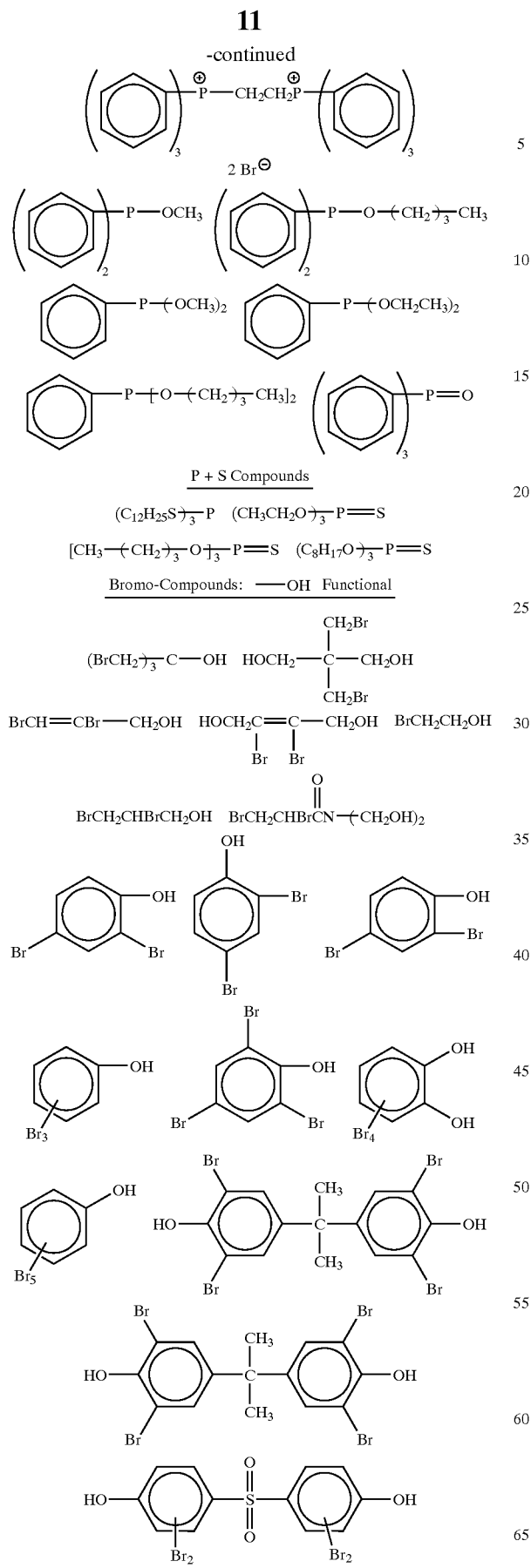
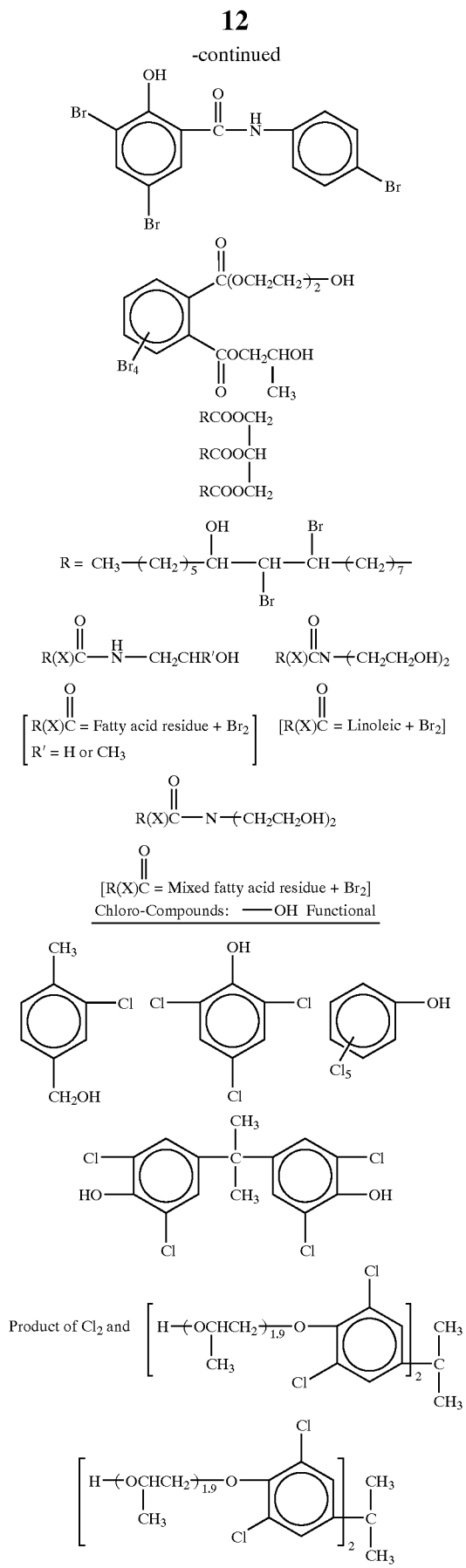

-continued
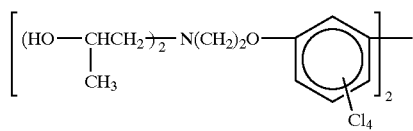
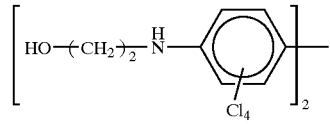
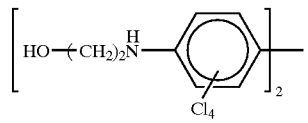
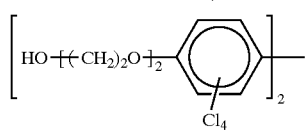
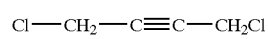
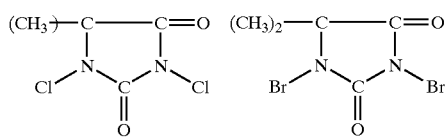
N—Halogen Functional
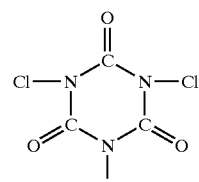
H₂C=C— Functional
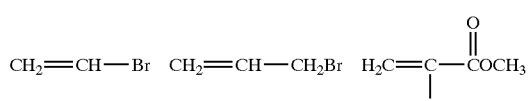
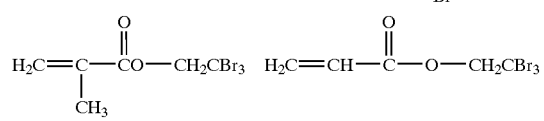
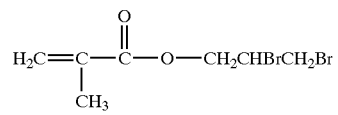
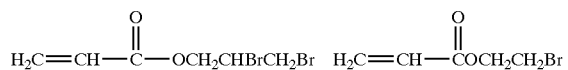
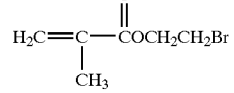
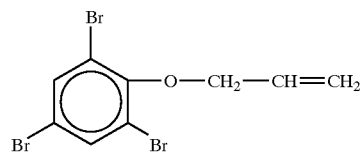
-continued
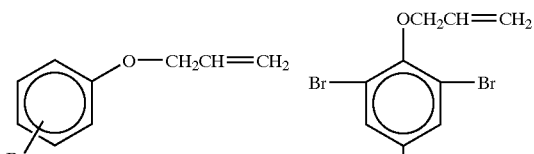
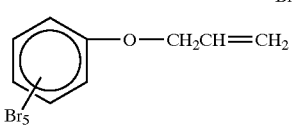
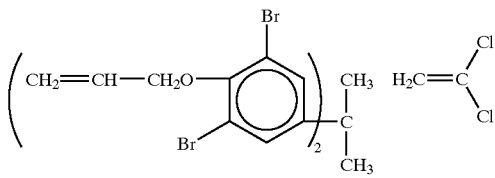
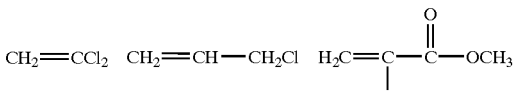
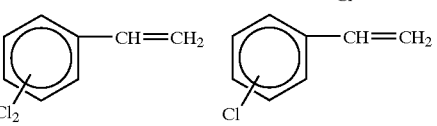
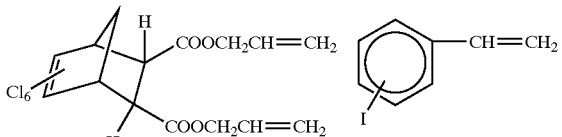
Functional
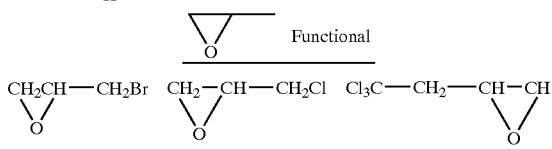
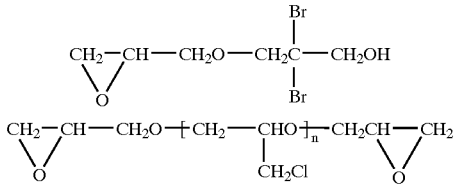
—C(=O)—O—C(=O)— Functional
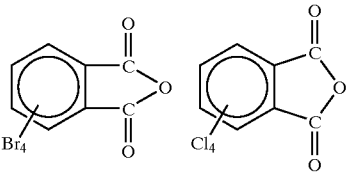
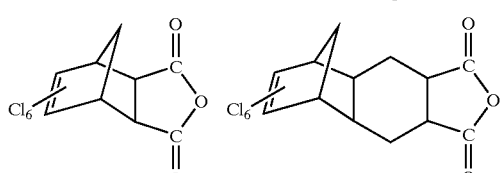
—COOH Functional -continued

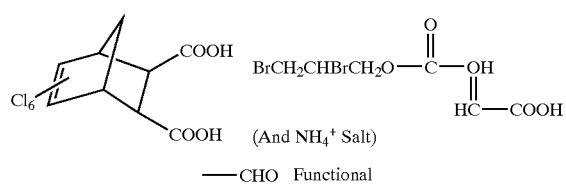

—CHO Functional

BrCH$_2$CHBr—CHO    Cl$_3$C—CHO

—NH$_2$ Functional

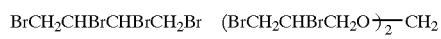
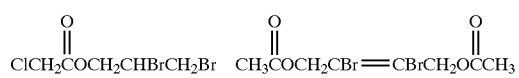

NON-FUNCTIONAL HALOGEN COMPOUNDS

Bromo-Compounds

BrCH$_2$Cl    Br$_2$CH—CHBr$_2$    BrCH$_2$CH$_2$CHCl

BrCH$_2$CHBrCHBrCH$_2$Br    (BrCH$_2$CHBrCH$_2$O)$_2$—CH$_2$

ClCH$_2$COCH$_2$CHBrCH$_2$Br    CH$_3$COCH$_2$CBr=CBrCH$_2$OCCH$_3$

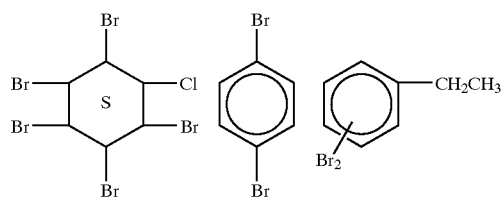
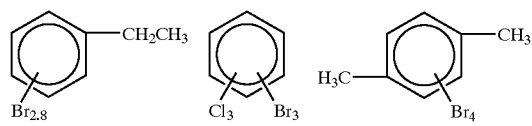
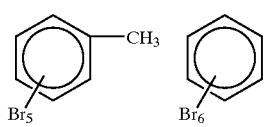

-continued

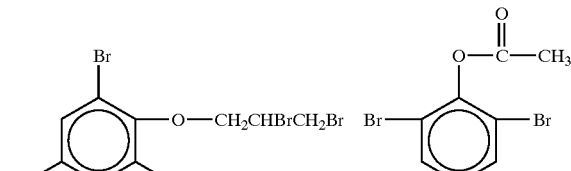

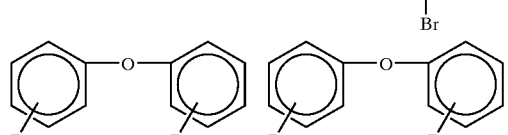

x + y = 5                x + y = 8

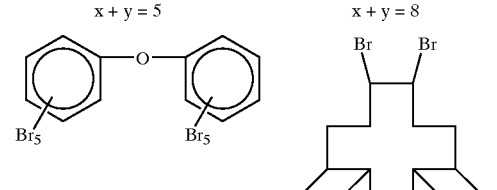

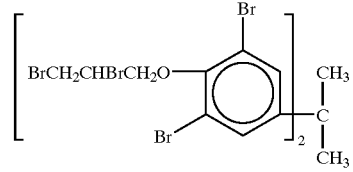

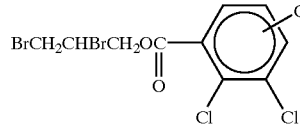

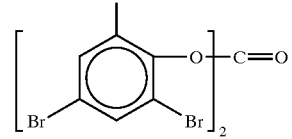

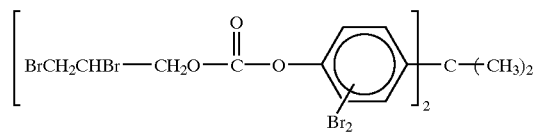

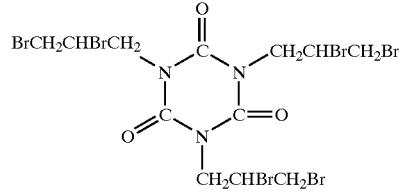

CH$_3$—(CH$_2$)$_7$—CHBr—CHBr—(CH$_2$)$_7$—CN(CH$_3$)$_2$

R(X)C—OR'    R(X)C—OCH$_3$ (Soybean Oil + Br$_2$)    [R(X)C = Linoleate residue + Br$_2$]

Chloro-Compounds

Cl$_3$C—CCl$_3$    ClCH$_2$CHClCH$_2$Cl    Cl$_2$C=CCl—CCl=CCl$_2$

-continued

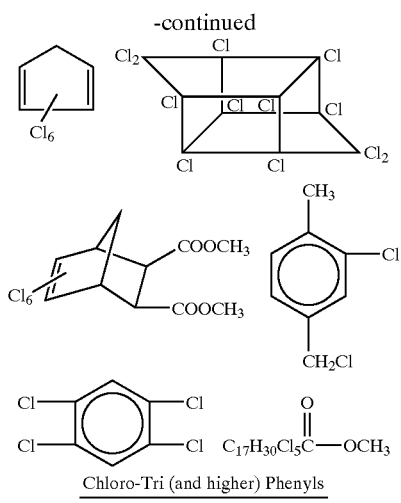

Chloro-Tri (and higher) Phenyls

Bromo- and Chloro-Biphenyls

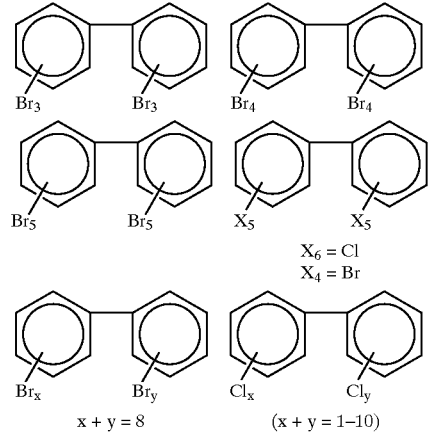

Chloro-Naphthalenes

HALOGENATED PARAFFINES

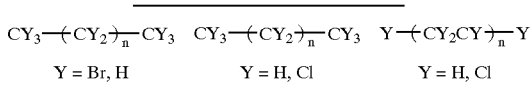

Y = Br, H    Y = H, Cl    Y = H, Cl

Suitable inorganic fire retardant additives include: antimony oxide ($Sb_2O_3$), antimony sulfides ($Sb_2OS_3$, $Sb_2S_3$, $Sb_2S_4$), antimony halides ($SbCl_3$, $SbCl_5$, $SbBr_3$, $SbBr_5$), sodium or potassium antimonite, e.g., ($NaSbO_3$), ammonium, sodium or potassium phosphates, e.g., (($NH_4$)$_3$PO$_4$, ($NH_4$)$_2$HPO$_4$, ($NH_4$)$H_2PO_4$, ($NH_4PO_3$)$_x$), phosphorus halides ($PCl_3$, $PCl_5$, $POCl_3$), phosphonitrilic chloride ($PNCl_2$)$_x$, phosphorus pentasulfide ($P_2S_5$), sodium borates ($Na_2O(B_2O_3)_{3.5}$·$4H_2O$, $Na_2B_4O_7$·$10H_2O$), sodium, potassium or ammonium tetrafluoroborate, e.g. ($NaBF_4$), calcium or barium borates, e.g., ($Ca(BO_2)_2$, $Ca_3(BO_3)_2$), lithium, sodium or potassium tetraborate, e.g. ($LiB_4O_7$), boric acid ($H_3BO_3$), trimethoxyborozine (($CH_3OBO$)$_3$), aluminum oxide hydrates ($Al_2O_3$·$3H_2O$, $Al(OH)_3$), aluminophosphate hydrates ($Al_2O_3$·($AlPO_4$)$_x$·($H_2O$)$_y$), sodium silicates (($Na_2O$)$_n$$SiO_2$)$_m$), ammonium bromide ($NH_4Br$), ammonium sulfate (($NH_4$)$_2SO_4$), lithium silicates ($LiO_2(SiO_2)_{5.9}$, $Li_2O(Na_2O)_n(SiO_2)_m$)), molybdenum oxide ($MoO_3$), ammonium paramolybdate (($NH_4$)$_6Mo_7O_{24}(H_2O)_x$), molybdenum sulfide ($MoS_2$), and sulfamide (($NH_2$)$_2SO_2$).

Suitable organometallic fire retardant additives include the following:

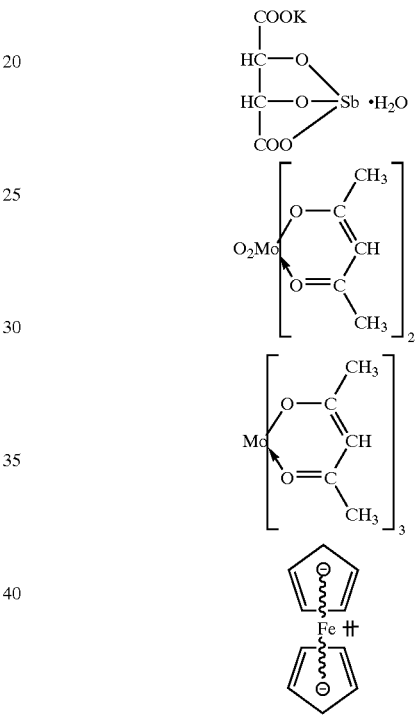

Examples of suitable intrinsically fire retardant polymers useful in the fire retardant bonding material include halogenated polymers such as chlorinated polyethylene, polyvinyl chloride, poly(1,1-dichloroethylene), poly(chlorotrifluoroethylene), poly(1,1-dichloro-2-fluoroethylene), poly(1,2-dichloro-1,2-difluoroethylene), poly(1,1-difluoroethylene), poly(1,2 difluroethylene), poly(tetrafluoroethylene), poly(trifluorethylene), poly((pentafluoroethyl)ethylene), poly(tetradecafluoropentyl-ethylene), poly(hexafluoropropylene), poly(2,3,3,3-tetrafluoropropylene), poly(3,3,3-trifluoropropylene), poly(heptafluoropropyl)ethylene), poly(vinylidene fluoride), and poly(tribromostyrol), mixtures thereof, and copolymers of the antecedent monomers comprising these polymers.

Examples of non-halogenated intrinsically fire retardant polymers useful in the fire retardant bonding material include melamine-formaldahyde, urea-formaldahyde, phenol-formaldahyde, and other phenolic polymers and copolymers such as the formaldehyde-furfural-resorcinol-phenol product sold in two part monomeric form by Borden Chemicals and Plastics under the designation FIRE PRF2-1000.

Preferably the fire retardant bonding material is comprised of a blend of antimony oxide ($Sb_2O_3$), decabromodiphenyl ether and polychlorinated paraffin wax in a polyacrylate resin binder designated BOSTIK®14-576-3 (Bostik Findley, Inc.).

The non-polymeric portion of the fire retardant bonding material may be comprised of an intumescent composition. Intumescent compositions act by forming, under the influence of heat, an expanded insulating layer of fire resistant material. The intumescent material may also undergo an endothermic decomposition.

An intumescent composition swells to produce a char more than five times its original thickness. The expanded material shields a substrate from oxygen and/or from overheating and thereby prevents or delays the spread of flame. Intumescent systems typically consist of a polymer, a char or carbon skeleton-forming substance ("carbonific"), an expanding agent ("spumific") and an acid forming substance. As carbonifics, organic polyhydroxy compounds such as pentaerythritol, dipentaerythritol, tripentaerythritol, starch and sugars have been employed. Examples of spumifics are nitrogen-containing compounds such as melamine, melamine salts, melamine derivatives, urea, dicyandiamide and guanidine. The spumific effects the formation of an intumescent layer by emission of an inert gas. As acid forming substances usually an aminophosphate, ammonium phosphates, amine phosphates, ammonium polyphosphates, and melamine phosphate have been employed.

Intumescent compositions useful in the present invention have been described, for example, in U.S. Pat. Nos. 6,309, 746 B1; 6,228,914 B1; 5,962,603; 5,759,692; 5,708,065; 5,591,791; 5,356,568; 5,225,464; 5,185,103; 5,130,349; 4,857,364; 4,442,157; 4,542,170; 4,380,593; 4,198,328 and 3,849,178, hereby incorporated by reference to the extent not incompatible herewith.

In a preferred embodiment, a composite article of the invention is comprised of at least one ply of an intumescent resinous composition. A preferred intumescent resinous composition is a mixture of Borden Chemical phenolic resin FIRE PRF2-1000 and about 8 to about 18 wt % of a material comprised of melamine pyrophosphate ($C_3H_6N_6.H_4P_2O_7$) and bis(melamine pyrophosphoric) acid ($C_6H_{12}N_{12}.H_4P_4O_7$) sold by Broadview Technologies, Inc., under the designation of MAXICHAR®.

Preferably, the intumescent resinous composition is additionally comprised of about 2 to about 35 wt % of glass bubbles such as the soda-lime borosilicate glass bubbles sold by Minnesota Mining and Manufacturing Co. under the designation 3M® SCOTCHLITE® glass bubbles. Most preferably, the glass bubbles are of a size such that no more than 5 wt. % are retained on a Number 80 U.S. Standard Sieve (177 micron).

It is preferred that at least one ply of a composite article of the invention is comprised of a plurality of layers, each of said layers comprising a network of flammable polymeric fibers in a matrix, said polymeric fibers having a tenacity of at least about 25 g/denier, a tensile modulus of at least about 900 g/denier and an energy-to-break of at least about 25 Joules/g.

For the purposes of the present invention, a fiber is an elongate body the length dimension of which is much greater that the transverse dimensions of width and thickness. Accordingly, the term fiber includes filament, ribbon, strip, and the like having regular or irregular cross-section. A yarn is a continuous strand comprised of many fibers or filaments.

As used herein, "fiber network" denotes a plurality of fibers arranged into a predetermined configuration, or a plurality of fibers grouped together to form a twisted or untwisted yarn, which yarns are arranged into a predetermined configuration. The fiber network can have various configurations. For example, the fibers or yarn may be formed as a felt or other nonwoven, knitted or woven into a network by any conventional techniques. According to a preferred network configuration, the fibers in a layer are unidirectionally aligned so that they are substantially parallel to each other along a common fiber direction. Successive layers of such unidirectionally aligned fibers are preferably rotated with respect to the previous layer.

Flammable fibers are those that will support combustion. Flammable fibers include unmodified polyolefins, polyesters, polyvinyl alcohol, and polyacrylonitrile, among others.

Most preferably, the fiber network layers of the composite are arranged with the fiber direction of the unidirectional fibers of each network layer rotated with respect to the fiber direction of the unidirectional fiber of the adjacent layers. An example is a five layer ply with the second, third, fourth and fifth layers rotated +45°, −45°, 90° and 0° with respect to the first layer. A particularly preferred example is a fifty-layer ply with alternate layers aligned at 0° and 90° to each other.

Most preferably the flammable fibers comprising a composite of the invention are high strength polyethylene fibers. High strength polyethylene fibers for use in this invention are those having a tenacity equal to or greater than about 17 g/d, initial tensile modulus equal to or greater than about 500 g/d and an energy-to-break equal to or greater than about 20 J/g. For the purposes of this invention, the fiber tenacity, initial tensile modulus (modulus of elasticity) and energy-to-break are measured in yarn form by ASTM D2256. Preferred fibers are those having a tenacity equal to or greater than about 25 g/d, initial tensile modulus equal to or greater than about 900 g/d and an energy-to-break equal to or greater than about 25 J/g. Particularly preferred fibers are those having a tenacity equal to or greater than about 30 g/d, initial tensile modulus equal to or greater than about 1200 g/d, and an energy-to-break equal to or greater than about 30 J/g. Most preferred fibers are those having a tenacity equal to or greater than about 30 g/d, initial tensile modulus equal to or greater than about 1200 g/d, and an energy-to-break equal to or greater than about 40 J/g.

Such high strength polyethylene fibers may be grown in solution as described in U.S. Pat. Nos. 4,137,394 or 4,356, 138 or spun from a solution to form a gel structure, as described in German Off. No. 3,004,699 and GB No. 2051667, and especially as described in U.S. Pat. No. 4,413,110. The polyethylene fibers may also be produced by a rolling and drawing process as described in U.S. Pat. No. 5,702,657 and sold under the name TENSYLON® by ITS Industries Inc. As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-l-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated by reference.

Surprisingly, the composite articles of the invention meet the stringent fire resistant requirements for aircraft interiors despite the fact that the major portion is comprised of flammable fiber networks shielded by relatively thin fire retardant surface layers. Without being held to a particular theory of why the invention works, it is believed that the fiber network layers and the fire retardant surface layers work cooperatively to retard the propagation of a flame source. The outer metal foil and fire retardant bonding material block oxygen and provide an initial delay to propagation of high temperatures to the interior of the composite. When a high temperature front finally penetrates the outer layers of the composite, the flammable fibers shrink away from the heat source, creating a void space and delaying further propagation. In embodiments where an intumescent resinous composition lies between the fiber network layers and the composite surface, this delay is further increased. The total effect is a highly effective fire retardant composite meeting the requirements for aircraft interiors with a very wide margin of safety.

The following examples are presented to provide a more complete understanding of the invention. The specific techniques, conditions, materials, proportions and reported data are set forth to illustrate the principles of the invention and should not be construed as limiting the scope of the invention. In particular, the techniques described were for the preparation of test samples and are readily extended to implementation on a continuous production line.

EXAMPLES

Comparative Example 1

A nine-ply composite article was prepared having a symmetrical ply construction as follows:

$1^{st}$ and $9^{th}$ plies: type 302 stainless steel foil, 0.001 inch (0.0254 mm) thick;
$2^{nd}$ and $8^{th}$ plies: intumescent resinous composition;
$3^{rd}$ and $7^{th}$ plies: glass fabric impregnated with phenolic resin;
$4^{th}$ and $6^{th}$ plies: fire retardant pressure sensitive film adhesive; and
$5^{th}$ ply: 50 layers of unidirectional polyethylene fiber networks in an epoxy vinyl ester matrix.

The intumescent resinous composition comprising the $2^{nd}$ and $8^{th}$ plies was a sheet material prepared as follows: A mixture was prepared consisting of 60.9 wt. % of a two-part formaldehyde-furfural-resorcinol-phenol monomer (Borden Durite FIRE PRF2-1000; Part A-100 pph, Part B-24 pph), 9.1 wt. % of an intumescent additive comprising melamine pyrophosphate $(C_3H_6N_6 \cdot H_4P_2O_7)$ and bis(melamine pyrophosphoric) acid $(C_6H_{12}N_{12} \cdot H_4P_4O_7)$ (Broadview Technologies MAXICHAR®) and 30 wt. % of glass bubbles (3M Type K1). The mixture was evenly spread to a thickness of 0.020 inch (0.51 mm) on a silicone release paper with another release paper placed on top. The mixture was cured into a solid sheet by heating for 30 minutes at about 200° F. (93° C.) under slight pressure of about 1 psi (7 kPa)) in a press. The edges of the sheet were trimmed to straightness and the sheet was divided into two equal sections to form the $2^{nd}$ and $8^{th}$ plies of the composite.

The impregnated glass fabric comprising the $3^{rd}$ and $7^{th}$ plies was a 57×54 ends/inch (22×21 ends/cm) satin weave E-glass fabric, style 7781, pre-pregged with fire retardant LC 194 phenolic resin (Lewcott Corp.) and having a thickness of about 0.095 inch (2.41 mm).

The fire-retardant, pressure-sensitive film adhesive forming the $4^{th}$ and $6^{th}$ plies was a blend of antimony oxide $(Sb_2O_3)$, decabromodiphenylether and polychlorinated paraffin wax in an acrylate ester resin binder designated BOSTIK®14-576-3 (Bostik Findley, Inc.).

The central fifth ply consisted of 50 layers of high strength polyethylene fibers, unidirectionally aligned within a layer and arranged with the fibers in adjacent layers oriented at 90° to one another. The polyethylene fibers were of 1100 denier, had a tensile strength of about 3.1 GPa, an initial tensile modulus of about 107 GPa, an elongation-to-break of about 3.3% and were in a matrix comprising an epoxy vinyl ester resin having a tensile modulus of about 500 kpsi (3.5 Gpa). (SPECTRA SHIELD® VE PLUS from Honeywell International Inc.)

The plies of the composite article were assembled and bonded together in a press under a pressure of 100 psi (690 kPa) at a temperature of 121° C. for 30 minutes.

A test of the composite article conducted according to 14 USC §25.853, Appendix F, Part IV, showed an average maximum heat release rate of 11 kW/m² compared to a requirement of less than 65 kW/m². However, the panel had an areal density of 1.84 lb/ft² (8.99 kg/m²), which was considered excessive.

Comparative Example 2

A nine-ply composite article was prepared having a symmetrical ply construction identical to that in Comparative Example 1 except for the $2^{nd}$ and $8^{th}$ plies. The intumescent resinous composition comprising the $2^{nd}$ and $8^{th}$ plies was a sheet material prepared as follows:

The two parts of an intumescent epoxy resin containing melamine pyrophosphate and bis(melamine pyrophosphoric) acid (INTUMAX® EP1115, Broadview Technologies, Inc.) were mixed together and evenly spread to a thickness of 0.020 inch (0.51 mm) on a silicone release paper with another release paper placed on top. No glass bubbles were included in this resin. The mixture was cured into a solid sheet by heating for 30 minutes at about 200° F. (93° C.) under slight pressure of about 1 psi (7 kPa)) in a press. The edges of the sheet were trimmed to straightness and the sheet was divided into two equal sections to form the $2^{nd}$ and $8^{th}$ plies of the composite.

The remaining plies of the composite were identical to the corresponding plies described in Comparative Example 1.

The plies of the composite article were assembled and bonded together in a press under a pressure of 100 psi (690 kPa) at a temperature of 121° C. for 30 minutes.

A test of the composite article conducted according to 14 USC §25.853, Appendix F, Part IV, showed an average maximum heat release rate of 47 kW/m². This was within an acceptable range but poorer than the 11 kW/m² for the composite prepared in Comparative Example 1 and containing the glass bubbles. This composite article had an improved areal density of 1.56 lb/ft² (7.62 kg/m²), which was considered to be about at the outer edge of acceptability.

Example 1

A seven-ply composite article was prepared having a symmetrical ply construction as follows:

$1^{st}$ and $7^{th}$ plies: aluminum foil, 0.003 inch (0.076 mm) thick;
$2^{nd}$ and $6^{th}$ plies: intumescent resinous composition;
$3^{rd}$ and $5^{th}$ plies: fire retardant pressure sensitive film adhesive; and
$4^{th}$ ply: 50 layers of unidirectional polyethylene fiber networks in an epoxy vinyl ester matrix.

The intumescent resinous composition comprising the $2^{nd}$ and $6^{th}$ plies was prepared as follows: A mixture was prepared consisting of 95.3 wt. % of a two-part intumescent epoxy resin (INTUMAX® EP1115, Broadview Technologies, Inc.) and 4.7 wt. % of glass bubbles (3M Type K1). The mixture was evenly spread to a thickness of 0.016 inch (0.41 mm) on a silicone release paper with another release paper placed on top. The mixture was cured into a solid sheet by heating for 30 minutes at about 200° F. (93° C.) under slight pressure of about 1 psi (7 kPa)) in a press. The edges of the sheet were trimmed to straightness and the sheet was divided into two equal sections to form the $2^{nd}$ and $6^{th}$ plies of the composite.

The $3^{rd}$ and $5^{th}$ plies forming the fire-retardant, pressure-sensitive film adhesive comprised a blend of antimony oxide ($Sb_2O_3$), decabromo diphenyl ether and polychlorinated paraffin wax in an acrylate ester resin binder designated BOSTIK®14-576-3 (Bostik Findley, Inc.). The central, fourth ply consisted of 50 layers of high strength polyethylene fibers, unidirectionally aligned within a layer and arranged with the fibers in adjacent layers oriented at 90° to one another. The polyethylene fibers were of 1100 denier, had a tensile strength of about 3.1 GPa an initial tensile modulus of about 107 GPa, an elongation-to-break of about 3.3%, an energy-to-break of about 45 Joules per gram and were in a matrix comprising an epoxy vinyl ester resin having a tensile modulus of about 500 kpsi (3.5 Gpa) (SPECTRA SHIELD® VE PLUS from Honeywell International Inc.).

The plies of the composite article were assembled and bonded together in a press under a pressure of 100 psi (690 kPa) at a temperature of 121° C. for 30 minutes.

This composite article of the invention had an areal density of 1.22 lb/ft² (5.96 kg/m²) which was considered acceptable. The composite was subjected to testing according to 14 USC §25.853, Appendix F, Jan. 1, 2002, and United States United States Federal Aviation Administration Advisory Circular 25.795.2, 10 Jan. 2002, using .44 Magnum JHP bullets of 240 grains (15.6 g) mass and using 9 mm FMJ RN bullets of 124 grains (8.0 g) mass.

Flexural modulus (modulus of elasticity in bending) and the flexural strength at yield of the composite article was measured by the method of ASTM D790-00. The results of these tests are shown in Table I along with data for other examples and comparative examples. The composite article of Example 1 of the invention (comprising flammable polyethylene fibers) met all Federal Aviation Administration (FAA) requirements.

Example 2

A seven-ply composite article was prepared in an identical manner and having the same structure as the composite article of Example 1. This composite article had an areal density of 1.19 lb/ft² (5.82 kg/m²), which was considered acceptable. Test results in Table I show that the composite article of Example 2 met all FAA requirements.

Example 3

A seven-ply composite article was prepared having a symmetrical ply construction as follows:
$1^{st}$ and $7^{th}$ plies: aluminum foil, 0.003 inch (0.076 mm) thick;
$2^{nd}$ and $6^{th}$ plies: intumescent resinous composition;
$3^{rd}$ and $5^{th}$ plies: fire retardant pressure sensitive film adhesive; and
$4^{th}$ ply: 50 layers of unidirectional polyethylene fiber networks in a thermoplastic elastomeric matrix (SPECTRA SHIELD® PCR PLUS from Honeywell International Inc.).

The intumescent resinous composition comprising the $2^{nd}$ and $6^{th}$ plies as prepared as follows: A mixture was prepared consisting of 74.2 wt. % of a two-part formaldehyde-furfural-resorcinol-phenol monomer (Borden Durite FIRE PRF2-1000; Part A-100 pph, Part B-24 pph), 12.9 wt. % of an intumescent additive comprising melamine pyrophosphate ($C_3H_6N_6 \cdot H_4P_2O_7$) and bis(melamine pyrophosphoric) acid ($C_6H_{12}N_{12} \cdot H_4P_4O_7$) (Broadview Technologies MAXICHAR®) and 12.9 wt. % of glass bubbles (3M Type K1). The mixture was evenly spread to a thickness of about 0.016 inch (0.41 mm) on a silicone release paper with another release paper placed on top. The mixture was cured into a solid sheet by heating for 30 minutes at about 200° F. (93° C.) under slight pressure of about 1 psi (7 kPa) in a press. The edges of the sheet were trimmed to straightness and the sheet was divided into two equal sections to form the $2^{nd}$ and $6^{th}$ plies of the composite.

The $3^{rd}$ and $5^{th}$ plies comprising the fire-retardant, pressure-sensitive film adhesive comprised a blend of antimony oxide ($Sb_2O_3$), decabromo diphenyl ether and polychlorinated paraffin wax in a polyacrylate resin binder designated BOSTIK®14-576-3 (Bostik Findley, Inc.).

The central, fourth ply consisted of 50 layers of high strength polyethylene fibers, unidirectionally aligned within a layer and arranged with the fibers in adjacent layers oriented at 90° to one another. The polyethylene fibers were of 1100 denier, had a tensile strength of about 3.1 Gpa, an initial tensile modulus of about 107 Gpa, an elongation-to-break of about 3.3%, and an energy-to-break of about 45 Joules per gram. The high strength polyethylene fiber networks were in a matrix consisting of a thermoplastic elastomer having a tensile modulus of about 100 psi (6.9 kPa) (SPECTRA SHIELD® PCR PLUS from Honeywell International Inc.).

The plies of the composite article were assembled and bonded together in a press under a pressure of 100 psi (690 kPa) at a temperature of 121° C. for 30 minutes.

The composite article of the invention had an areal density of 1.19 lb/ft² (5.82 kg/m²) which was, considered acceptable. Test results in Table I show that the composite article of Example 3 met all FAA requirements.

Example 4

A five-ply composite article was prepared having a symmetrical ply construction as follows:
$1^{st}$ and $5^{th}$ plies: aluminum foil, 0.001 inch (0.025 mm) thick;
$2^{nd}$ and $4^{th}$ plies: fire-retardant, pressure-sensitive film adhesive-(BOSTIK®14-576-3); and
$3^{rd}$ ply: 50 layers of unidirectional polyethylene fiber networks in a thermoplastic elastomeric matrix (SPECTRA SHIELD® PCR PLUS from Honeywell International Inc.).

The plies of the composite article were assembled and bonded together in a press under a pressure of 100 psi (690 kPa) at a temperature of 121° C. for 30 minutes.

The composite article had a reduced areal density of 1.0 lb/ft² (4.89 kg/m²), which was considered acceptable. Test results in Table I show that the composite article of Example 4 met all FAA requirements.

Example 5

A five-ply composite article was prepared having a symmetrical ply construction identical to that in Example 4 except for the central, $3^{rd}$ ply. In this example, the central ply consisted of 50 layers of high strength polyethylene fibers, unidirectionally aligned within a layer and arranged with the fibers in adjacent layers oriented at 90° to one another. The polyethylene fibers were of 1100 denier, had a tensile strength of about 3.1 Gpa, an initial tensile modulus of about 107 GPa, an elongation-to-break of about 3.3% set forth other yarn physicals and were in a matrix comprising an epoxy vinyl ester resin having a tensile modulus of about 500 kpsi (3.5 GPa) (SPECTRA SHIELD®) VE PLUS from Honeywell International Inc.).

The plies of the composite article were assembled and bonded together in a press under a pressure of 100 psi (690 kPa) at a temperature of 121° C. for 30 minutes.

The composite article of Example 5 also had an areal density of 1.0 lb/ft$^2$ (4.89 kg/m$^2$), which was considered acceptable. Test results in Table I show that the composite article of Example 5 met all FAA requirements.

Having thus described the invention in rather full detail, it will be understood that such detail need not be strictly adhered to but that further changes and modifications may suggest themselves to one skilled in the art, all falling within the scope of the invention as defined by the subjoined claims.

a metal foil, a second ply is comprised of a fire retardant bonding material and a third ply is comprised of a plurality of layers, each of said layers comprising a network of flammable polymeric fibers in a matrix, said polymeric fibers having a tenacity of at least about 17 g/denier, a tensile modulus of at least about 500 g/denier and an energy-to-break of at least about 20 Joules/g.

3. The composite article of claim 2, additionally comprised of a fourth ply comprising a fire retardant bonding material and a fifth ply comprising a metal foil.

4. The composite article of claim 2, additionally comprising an intumescent resinous composition ply between said first and said second plies.

5. The composite article of claim 4, additionally comprising a fifth ply consisting of an intumescent resinous composition, a sixth ply comprised of a fire retardant bonding material and a seventh ply comprised of a metal foil.

6. The composite article of claim 2 or claim 4, wherein said metal foil is aluminum having a thickness from about 0.0005 inches (12.7 micrometers) to about 0.005 inches (127 micrometers).

7. The composite article of claim 2 or claim 4, wherein said fire retardant bonding material is comprised of a poly-

TABLE 1

| | | | | | | | Vertical Burn Test | | | | | |
| --- | --- | --- | --- | --- | --- | --- | --- | --- | --- | --- | --- | --- |
| Ex or Comp Ex No | Composite Skin | Intumescent Resinous Composition | Glass Bubbles % of Resin | SPECTRA SHIELD® Ballistic Panel Type | Flexural Modulus, psi | Flexural Strength at Yield, psi | Heat Release Rating, kW/m2 | Smoke Density, DS (max) | Burning Time, sec | Max. Burn Length, inches | Max longest burning particle, sec | Areal Density, psf | VO, ft/sec |
| FAA Requirements | | | | | | | <65 | <200 | <15 | <6 | <5 | | >1430 |
| Comp 1 | SS | phenolic | 30 | VE Plus | n.a. | n.a. | 11 | 95 | 0 | 1.5 | 0 | 1.84 | n.a |
| Comp 2 | SS | epoxy | 0 | VE Plus | n.a. | n.a. | 47 | n.a. | n.a. | n.a. | n.a. | 1.56 | n.a |
| 1 | Al | epoxy | 4.7 | VE Plus | n.a. | n.a. | 0 | n.a. | n.a. | n.a. | n.a. | 1.22 | >1430 |
| 2 | Al | epoxy | 4.7 | VE Plus | 676,000 | 3344 | 0 | 16 | 0 | 0.2 | 0 | 1.19 | >1430 |
| 3 | Al | phenolic | 12.9 | PCR Plus | 87,930 | 937 | 1 | 9 | 0 | 0.8 | 0 | 1.19 | >1430 |
| 4 | Al | none | 0 | PCR Plus | n.a. | n.a. | 0 | 35 | 0 | 1.5 | 0 | 1.00 | >1430 |
| 5 | Al | none | 0 | VE Plus | n.a. | n.a. | 0 | 3 | 0 | 1.5 | 0 | 1.00 | >1430 | n.a. - not available

What is claimed is:

1. A composite article comprising a polymeric flammable fibers in a network said article having a flexural modulus of at least about 80,000 lbs/sq. in (552 MPa) as measured by ASTM D 790-00, a flexural strength at yield of at least about 800 lb/sq. in. (5.52 MPa) as measured by ASTM D 790-00, an areal density of about 0.9 lb/ft$^2$ (4.40 kg/m$^2$) to about 1.5 lb/ft$^2$ (5.88 kg/m$^2$), a fire resistance meeting the requirements of §25.853 Title 14 of the United States Code, Jan. 1, 2002, and a V0 velocity at least about 1430 ft/sec (427 m/s) when tested by United States Federal Aviation Administration Advisory Circular 25.795.2, 10 Jan. 2002, using .44 Magnum Jacketed Hollow Point (JHP) bullets of 240 grains (15.6 g) mass and using 9 mm Full Metal Jacketed, Round Nose (FMJ RN) bullets of 124 grains (8.0 g) mass.

2. A composite article comprised of a plurality of plies bonded together, said composite having an areal density of about 0.9 lb/ft$^2$ (4.40 kg/m$^2$) to about 1.5 lb/ft$^2$ (5.86 kg/m$^2$), a fire resistance meeting the requirements of §25.853 Title 14 of the United States Code, Jan. 1, 2002, and a V0 velocity at least about 1430 ft/sec (427 m/s) when tested by United States Federal Aviation Administration Advisory Circular 25.795.2, 10 Jan. 2002, using .44 Magnum Jacketed Hollow Point (JHP) bullets of 240 grains (15.6 g) mass and using 9 mm Full Metal Jacketed, Round Nose (FMJ RN) bullets of 124 grains (8.0 g) mass wherein a first ply is comprised of meric binder selected from the group consisting of polyolefins, polydienes, polyesters, polyamides, vinyl polymers, ionomers, acrylics, acrylates, polysulfones, polyphenylene oxide, acetals, silicones, thermoplastic polyurethanes, thermoplastic polyimides, polyketones, phenolic polymers, melamine polymers, epoxies, silicones, unsaturated polyesters, thermosetting polyurethanes, and copolymers and halogenated derivatives thereof, and at least one member selected from the group consisting of organic, inorganic and organometallic fire retardants, said organic fire retardant is at least one member selected from the group consisting of phosphorus functional, phosphorus-chlorine functional, compounds containing phosphorus and sulfur, compounds containing phosphorous and bromine, compounds containing phosphorous and chlorine, phosphites, phosphates, phosphonates, OH-functional bromine compounds, OH-functional chlorine compounds, nitrogen-halogen functional, vinyl functional halogen compounds, epoxide functional halogen compounds, anhydride functional halogen compounds, acid functional halogen compounds, aldehyde functional halogen compounds, amine functional halogen compounds, non functional halogen compounds, halogenated phenyls, halogenated paraffins and cholo-naphthalenes, said inorganic fire retardant is at least one member selected from the group consisting of antimony oxide ($Sb_2O_3$), antimony sulfides ($Sb_2OS_3$, $Sb_2S_3$, $Sb_2S_4$), antimony halides ($SbCl_3$, $SbCl_5$, $SbBr_3$, $SbBr_5$), sodium or potassium antimonite, e.g., ($NaSbO_3$), ammonium, sodium or potassium phosphates, e.g., (($NH_4)_3PO_4$, $(NH_4)_2HPO_4$, $(NH_4)H_2PO_4$, $(NH_4PO_3)_x$), phosphorus halides ($PCl_3$, $PCl_5$, $POCl_3$), phosphonitrilic chloride ($PNCl_2)_x$, phosphorus pentasulfide ($P_2S_5$), sodium borates ($Na_2O(B_2O_3)_{3.5} \cdot 4H_2O$, $Na_2B_4O_7 \cdot 10H_2O$), sodium, potassium or ammonium tetrafluoroborate, e.g. ($NaBF_4$), calcium or barium borates, e.g., ($Ca(BO_2)_2$, $Ca_3(BO_3)_2$), lithium, sodium or potassium tetraborate, e.g. ($LiB_4O_7$), boric acid ($H_3BO_3$), trimethoxyborozine (($CH_3OBO)_3$), aluminum oxide hydrates ($Al_2O_3 \cdot 3H_2O$, $Al(OH)_3$), aluminophosphate hydrates ($Al_2O_3 \cdot (AlPO_4)_x \cdot (H_2O)_y$), sodium silicates (($Na_2O)_n SiO_2)_m$), ammonium bromide ($NH_4Br$), ammonium sulfate (($NH_4)_2SO_4$), lithium silicates ($LiO_2(SiO_2)_{5.9}$, $Li_2O(Na_2O)_n(SiO_2)_m$)), molybdenum oxide ($MoO_3$), ammonium paramolybdate (($NH_4)_6Mo_7O_{24}(H_2O)_x$), molybdenum sulfide ($MoS_2$), and sulfamide (($NH_2)_2SO_2$), said organometallic fire retardant is at least one member of the group consisting of

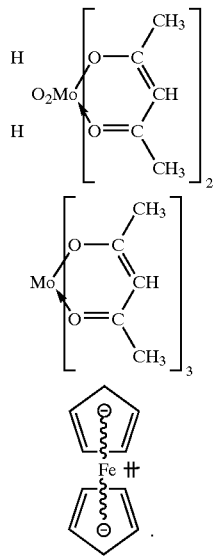

8. The composite article of claim 2 or claim 4, wherein said fire retardant bonding material is a blend of antimony oxide ($Sb_2O_3$), decabromodiphenyl ether and polychlorinated paraffin wax in a polyacrylate resin binder.

9. The composite article of claim 2 or claim 4, wherein said flammable polymeric fibers are polyethylene.

10. The composite article of claim 9, wherein said polyethylene fibers are unidirectionally oriented within a layer, and wherein fibers in adjacent layers are oriented at about 90° to one another.

11. The composite article of claim 2 or claim 4, wherein said matrix is an elastomer having a initial tensile modulus of less than about 6000 psi (41.4 MPa) as measured by ASTM D638.

12. The composite article of claim 11, wherein said matrix is an elastomer comprising a block copolymer of a congugated diene and a vinyl aromatic monomer.

13. The composite article of claim 12, wherein said intumescent resinous composition is additionally comprised of about 2 to about 35 wt % of glass bubbles.

14. The composite article of claim 2 or claim 4, wherein said matrix is a thermosetting resin having a tensile modulus of at least about 300 kpsl (2.1 GPa).

15. The composite article of claim 14, wherein said matrix is an epoxy vinyl ester resin.

16. The composite article of claim 4, wherein said intumescent resinous composition is comprised of a spumific selected from the group consisting of melamine, melamine salts, melamine derivatives urea, dicyandiamide and guanidine dispersed in a resin selected from the group consisting of phenolic polymers, melamine polymers, epoxies, silicones, unsaturated polyesters, and thermosetting polyurethanes.

17. The composite article of claim 4, wherein said intumescent resinous composition is comprised of at least one member selected from the group consisting of melamine pyrophosphate ($C_3H_6N_6 \cdot H_4P_2O_7$) and bis(melamine pyrophosphoric) acid ($C_6H_{12}N_{12} \cdot H_4P_4O_7$), and a member selected from the group consisting of a formaldehyde-furfural-resorcinol-phenol resin and an epoxy resin.

18. The composite article of claim 2 having a flexural modulus of at least about 80,000 lbs/sq. in (552 MPa), as measured by ASTM D 790-00, a flexural strength at yield of at least about 800 lb/sq. in. (5.52 MPa) as measured by ASTM D790-00, a fire resistance meeting the requirements of §25.853 Title 14 of the United States Code, Jan. 1, 2002, and a V0 velocity at least about 1430 ft/sec (427 m/s) when tested by United States Federal Aviation Administration Advisory Circular 25.795.2, 10 Jan. 2002, using .44 Magnum Jacketed Hollow Point (JHP) bullets of 240 grains (15.6 g) mass and using 9 mm Full Metal Jacketed, Round Nose (FMJ RN) bullets of 124 grains (8.0 g) mass.

* * * * *